United States Patent
Shi et al.

(10) Patent No.: US 8,555,444 B2
(45) Date of Patent: Oct. 15, 2013

(54) JOINT EQUIPMENT AND BOARDING BRIDGE HAVING THE SAME

(75) Inventors: Lei Shi, Guangdong (CN); Yuefeng Yang, Guangdong (CN); Zhaohong Zhang, Guangdong (CN)

(73) Assignees: China International Marine Containers (Group) Co., Ltd., Shenzhen, Guangdong (CN); Shenzhen Cimc-Tianda Airport Support Ltd., Shenzhen, Guangdong (CN)

( * ) Notice: Subject to any disclaimer, the term of this patent is extended or adjusted under 35 U.S.C. 154(b) by 221 days.

(21) Appl. No.: 13/093,340

(22) Filed: Apr. 25, 2011

(65) Prior Publication Data

US 2011/0258787 A1   Oct. 27, 2011

(30) Foreign Application Priority Data

Apr. 26, 2010   (CN) .......................... 2010 1 0160675

(51) Int. Cl.
  *E01D 1/00*   (2006.01)
(52) U.S. Cl.
  USPC .......................................................... 14/71.5
(58) Field of Classification Search
  USPC ................. 14/69.5–72.5; 244/137.2
  See application file for complete search history.

(56) References Cited

U.S. PATENT DOCUMENTS

| | | | | |
|---|---|---|---|---|
| 3,126,112 A * | 3/1964 | Shaw et al. | ................. | 414/495 |
| 3,664,456 A * | 5/1972 | Smith et al. | ................. | 182/62.5 |
| 5,761,757 A * | 6/1998 | Mitchell et al. | ................. | 14/71.5 |
| 6,122,789 A * | 9/2000 | Stephenson et al. | ........... | 14/71.5 |
| 6,131,225 A * | 10/2000 | Puglisi | ............. | 14/71.1 |
| 6,195,826 B1 * | 3/2001 | LeBaron et al. | ................ | 14/71.5 |
| 6,212,724 B1 * | 4/2001 | Zhou | .............. | 14/71.5 |
| 6,543,076 B1 * | 4/2003 | Worpenberg et al. | .......... | 14/71.5 |
| 6,691,361 B2 * | 2/2004 | Rolfe et al. | ............. | 14/71.5 |
| 6,757,926 B2 * | 7/2004 | Konya | ............ | 14/71.5 |
| 6,802,096 B2 * | 10/2004 | Savage | .............. | 14/71.5 |
| 6,898,816 B2 * | 5/2005 | Tholen et al. | ................. | 14/71.5 |
| RE38,804 E * | 10/2005 | Stephenson et al. | ........... | 14/71.5 |
| 7,188,383 B2 | 3/2007 | Tholen et al. | | |
| 7,596,826 B2 * | 10/2009 | Anderberg | ..................... | 14/71.5 |
| 8,069,518 B2 * | 12/2011 | Saito et al. | ...................... | 14/71.5 |
| 8,074,315 B2 * | 12/2011 | Okahira et al. | ................. | 14/71.5 |
| 2002/0017002 A1 * | 2/2002 | Sloan et al. | .................. | 14/71.1 |
| 2002/0100128 A1 * | 8/2002 | Tholen et al. | .................. | 14/69.5 |
| 2003/0229955 A1 * | 12/2003 | Savage | ............. | 14/71.5 |
| 2005/0217039 A1 * | 10/2005 | Tholen et al. | .................. | 14/71.5 |
| 2007/0235591 A1 * | 10/2007 | Anderberg | ................. | 244/137.2 |
| 2009/0139039 A1 * | 6/2009 | Saito et al. | ...................... | 14/71.1 |
| 2010/0325818 A1 * | 12/2010 | Okahira et al. | ................ | 14/71.5 |

* cited by examiner

*Primary Examiner* — Matthew D Troutman
(74) *Attorney, Agent, or Firm* — Greer, Burns & Crain, Ltd.

(57) ABSTRACT

A joint equipment of a boarding bridge is provided, which is suitable for joining with a downwardly turned boarding gate of the aircraft and includes a floor frame having a concave notch at its front end; a first floor arranged at the opening of the concave notch; a sliding plate arranged under the first floor and slidable with respect to the first floor through a slide device arranged under the sliding plate; a joining plate rotatably connected in the front end of the sliding plate; a pair of front cover plates rotatably connected to the joining plate respectively; a pair of rear cover plates rotatably connected to the first floor, wherein the front cover plates are partly lapped over the rear cover plates respectively; an activating device for operating sliding movement of the sliding plate; and a pair of turning mechanisms for turning the pairs of the front and the rear cover plates respectively with respect to the joining plate and the first floor.

20 Claims, 6 Drawing Sheets

JOINT EQUIPMENT AND BOARDING BRIDGE HAVING THE SAME

FIELD OF THE INVENTION

The invention relates to a boarding bridge, particularly to a joint equipment of a boarding bridge and a boarding bridge having said joint equipment.

BACKGROUND

Boarding bridges, which serve as a connection between the boarding gates of aircraft and airport terminal buildings, have been widely used in airports, providing safe and comfortable walking spaces for the passengers entering or leaving the aircraft. The conventional boarding bridge is generally arranged with joint equipment suitable for providing a butt-joint connection with the left and right horizontally-opened boarding gates of the aircraft. However, the existing extension line aircraft are designed to have boarding gates that are up and down opened. The conventional joint equipment which is designed for the left and right opened boarding gate is not suitable for joining with the up and down opened boarding gate of the extension line aircraft. Thus, there is a need for a boarding bridge which can suitably join with the boarding gate of the extension line aircraft, especially in countries or regions where a large number of extension line aircrafts are in service.

SUMMARY OF THE INVENTION

The above-mentioned needs are met or exceeded by the present joint equipment and the present boarding bridge having said joint equipment.

According to one aspect of the invention, a joint equipment of a boarding bridge is provided which is suitable for joining with a downwardly turned boarding gate of an aircraft and comprises: a floor frame having a concave notch at its front end; a first floor arranged at the opening of the concave notch; a sliding plate arranged under the first floor and being slidable with respect to the first floor through a slide device arranged under the sliding plate; a joining plate rotatably connected in the front end of the sliding plate; a pair of front cover plates rotatably connected to the left and the right ends of the joining plate respectively; a pair of rear cover plates rotatably connected to the left and the right ends of the first floor respectively, wherein the pair of front cover plates are partly lapped over the pair of rear cover plates; an activating device for operating sliding movement of the sliding plate with respect to the first floor; and a pair of turning mechanisms arranged under the left and the right sides of the sliding plate respectively, for turning the front and the rear cover plates respectively with respect to the joining plate and the first floor.

In one embodiment of the invention, the slide device comprises: two first beams arranged under and fixed to respective the left and the right ends of the first floor; two guides fixed to the inner sides of the respective first beams; and two sets of rollers arranged at the underside of the sliding plate and suitable for engaging with and rolling along the guide.

In another embodiment of the invention, each of the guides is equipped with a collision preventing block at its at least one end.

In yet another embodiment of the invention, the activating device comprises an activator with its one end connected to the underside of the floor frame and its opposite end connected to the underside of the sliding plate.

In still another embodiment of the invention, the joint equipment further comprises a plug-and-play typed guardrail, which can be detachablely installed onto the floor frame by inserting into holes arranged in the floor frame adjacent to the notch.

In yet another embodiment of the invention, each of the turning mechanism comprises: a mounting seat having a substantively triangle profile with its one side part being fixed to the bottoms of the corresponding ones of the first beams and the guides and its downward angle part being used as a hinge point; a curved lever having a first end pivotably connected to the hinge point and a second end, a wedged block fixed to the first end of the curved lever; a wedged plate arranged at the underside of the sliding plate for engaging and cooperating with the wedged block; and a connecting plate fixed to the underside of the corresponding rear cover plate and having an elongated groove therein, wherein the second end of the curved lever is configured to be suitable to limited in and slides along the elongated groove.

In yet another embodiment of the invention, the floor frame is arranged with two ferry plates at left and right sides of its rear end respectively.

In still another embodiment of the invention, a first safety edge is arranged at the front end of the joining plate, with a pressure sensor arranged thereon.

In yet another embodiment of the invention, two second beams are arranged at the underside of the floor frame beside the notch, paralleling to the first beams, wherein second safety edges are arranged face to face at the bottoms of the corresponding first and second beams, with a pressure sensor arranged thereon.

In yet another embodiment of the invention, a detachable and movable front edge is arranged at the front end of the floor frame.

According to another aspect of the invention, a boarding bridge for connecting a terminal building with an aircraft is provided, which comprises: a tunnel having a front end and a rear end connected with the terminal building; a rotunda arranged at the front end of the tunnel; and joint equipment for joining with an boarding gate of the aircraft. Said joint equipment comprises: a floor frame having a concave notch at its front end and movably connected to the rotunda; a first floor arranged at the opening of the concave notch; a sliding plate arranged under the first floor and being slidable with respect to the first floor through a slide device arranged under the sliding plate; a joining plate rotatably connected in the front end of the sliding plate; a pair of front cover plates rotatably connected to the left and the right ends of the joining plate respectively; a pair of rear cover plates rotatably connected to the left and the right ends of the first floor respectively, wherein the pair of front cover plates are partly lapped over the pair of rear cover plates; an activating device for forcing the sliding plate sliding with respect to the first floor; and a pair of turning mechanisms arranged under the left and the right sides of the sliding plate respectively, for turning the front and the rear cover plates respectively with respect to the joining plate and the first floor.

In the present invention, the extension or retraction of the sliding plate with respect to the first floor can be realized and operated sliding movement by means of the slide device and the activating device. When the joint equipment of the invention is needed to join with the boarding gate of the extension line aircraft, the sliding plate is forced to retract so that a void space presents in front of the first floor for accommodating the treads on the downward turned boarding gate of the aircraft. When the sliding plate retracting, the pair of front cover plates and the pair of rear cover plates are respectively turned upwardly with respect to the joining plate and the first floor. The upward arranged cover plates defining a relatively sealed joining channel for the passengers to pass.

Furthermore, as the front and the rear cover plates are all turned upwardly, gaps are formed between the floor frame and the first floor, for accommodating the guardrail of the aircraft. Meanwhile, holes can be further provided in the floor frame beside the concave notch, so that detachable guardrails can be installed on the floor frame for further increasing the safety for the passengers.

Moreover, the detachable front edge arranged at the front end of the floor frame enhances the protection to the aircraft, and can be easily detached for replace, repair or maintenance. The first safety edge arranged at the front end of the joining plate and the second safety edges arranged at the bottoms of the first and the second beams, as well as the pressure sensors arranged thereon, also provides a effective protection to the aircraft.

BRIEF DESCRIPTION OF THE DRAWINGS

The invention will now be described in details in accompaniment with the attached drawings and embodiments, in which.

DETAILED DESCRIPTION OF THE PREFERRED EMBODIMENT

Figure 1:
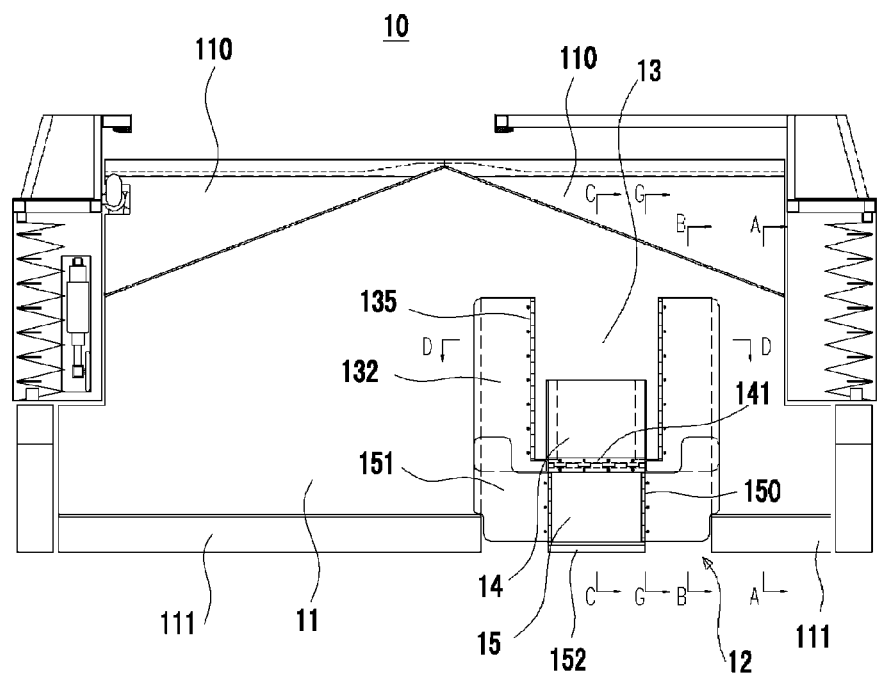
FIG. 1 is a top plan view of the joint equipment for boarding bridge of one embodiment according to the invention in an idle state.

The invention will now be described in details through the following example embodiments. However, it is understood that an element, a structure or a feature in an embodiment can be beneficially incorporated into other embodiments without further recitation.

FIGS. 1 to 6 show an embodiment of the joint equipment 10 according to the invention, which is movably arranged at the front end of the boarding bridge and suitable for joining with an up and down opened boarding gate of an extension line aircraft. The joint equipment 10 comprises a movable floor frame 11 with two ferry plates 110 arranged at respective the left and the right sides of the rear end of the floor frame 11. Preferably, each of the ferry plates is configured into a triangle-shaped structure for connecting with the tunnel of the boarding bridge, for example a rotunda arranged the end of the tunnel. The floor frame 11 is designed to have a concave notch 12 at its front end. A first floor 13 is arranged at the opening of the notch 12. Two first beams 131, preferably made of rectangular tubes, are arranged under and fixed to the left and the right ends of the first floor 13 respectively (seeing FIG. 3). A sliding plate 14 is arranged under the first floor 13 and between the first beams 131. A joining plate 15 is hinged to a front end of the sliding plate 14 through a hinge 141 so that the joining plate 15 can be turned around the hinge 141 by a certain angle with respect to the sliding plate 14. A slide device is arranged under the sliding plate 14, through which the sliding plate 14 can slide with respect to the first floor 13.

Figure 2:
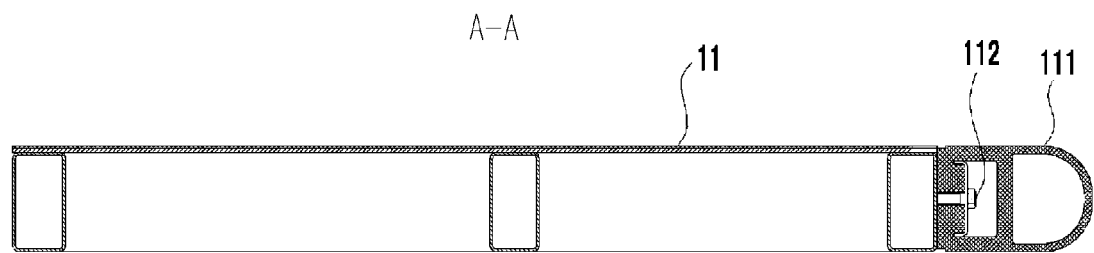
FIG. 2 is a sectional view along the line A-A in FIG. 1.

A pair of front cover plates 151 are respectively hinged to the left and the right ends of the joining plate 15 through hinges 150, while a pair of rear cover plates 132 are respectively hinged to the left and the right ends of the joining plate 13 through hinges 135. The front and the rear cover plates 151, 132 are so configured and arranged that the front cover plates 151 are partly lapped over and contact with the corresponding rear cover plates 132. Preferably, the joining plate 15 is provided with a first safety edge 152 at its front edge. As shown in FIG. 2, the floor frame 11 is provided with a detachable and movable front edge 111 at its front end, providing a protection to the aircraft. According to one embodiment of the invention, the front edge 111 is detachably connected with the floor frame 11, for example, through bolts 112, so that it can be easily disassembled from the floor frame 11 for replacing, repairing or maintenance.

Figure 3:
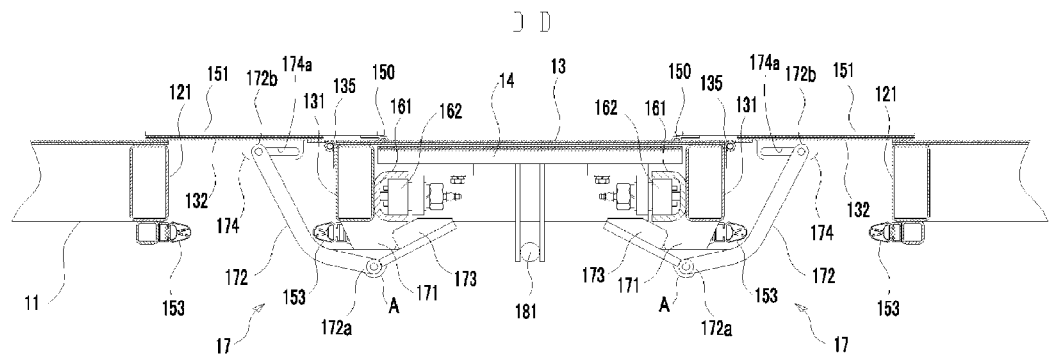
FIG. 3 is a sectional view along the line D-D in FIG. 1.
Figure 4:
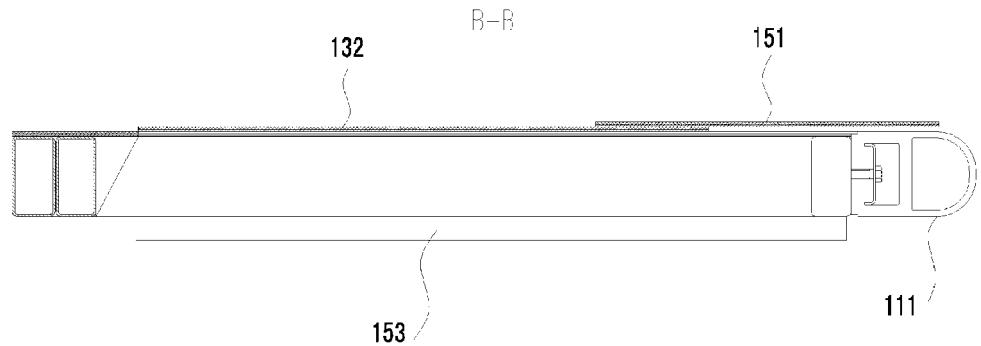
FIG. 4 is a sectional view along the line B-B in FIG. 1.

As shown in FIGS. 3 and 4, the slide device in one embodiment comprises two guides 161 fixed to the inner sides of the respective first beams 131 of the floor frame 11 respectively and two sets of rollers 162 arranged at the underside of the left and the right ends of the sliding plate 14 respectively. The sets of rollers 162 are suitable to engage with and roll along the respective guides 161, so that the sliding plate 14 is slidable with respect to the floor frame 11 along the guides 161. According to a preferred embodiment of the invention, the guides 161 are C-shaped guides.

Figure 6:
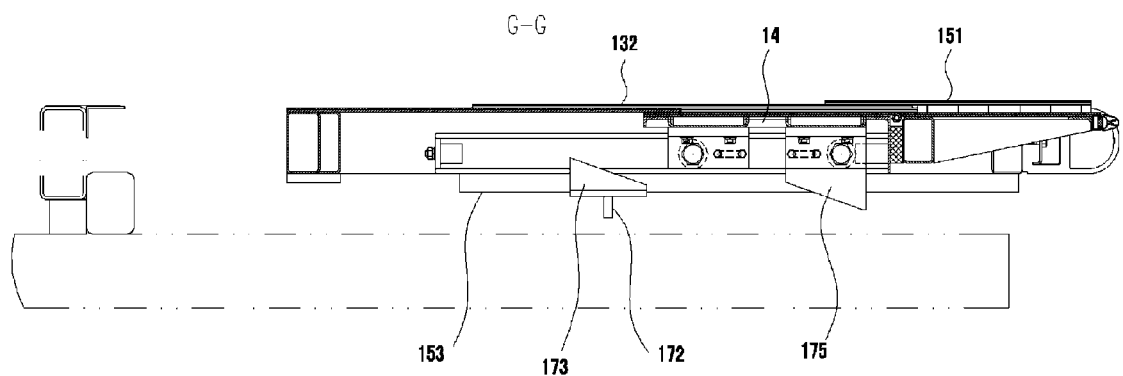
FIG. 6 is a sectional view along the line G-G in FIG. 1.
Figure 7:
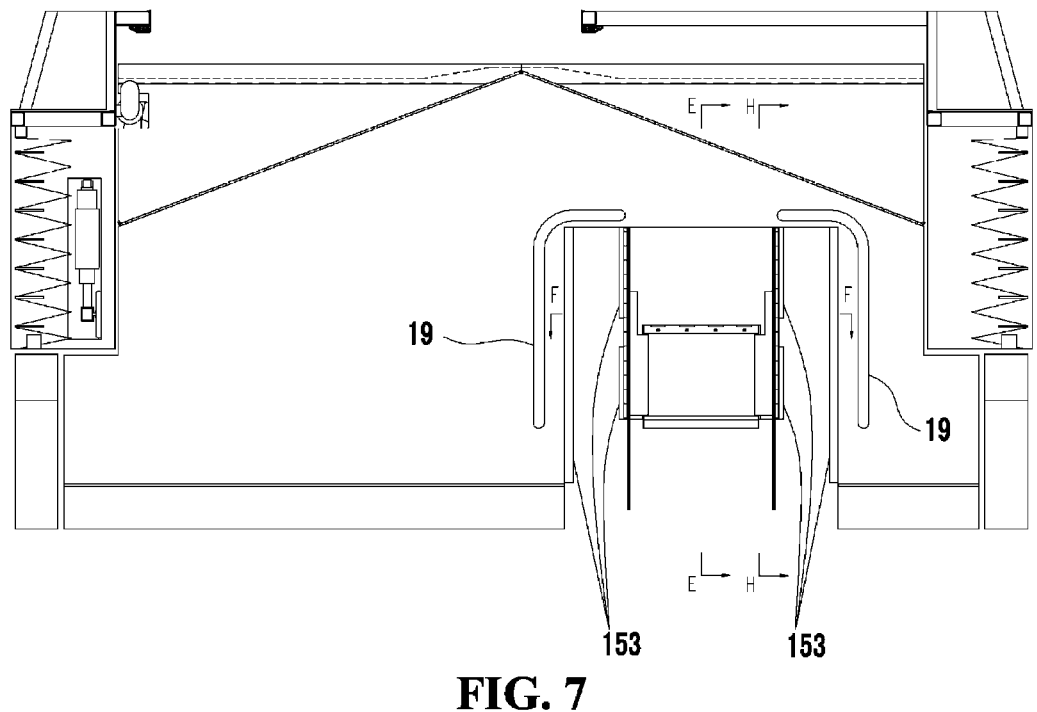
FIG. 7 is a top plan view of the joint equipment of one embodiment according to the invention, which is in an operational state.
Figure 8:
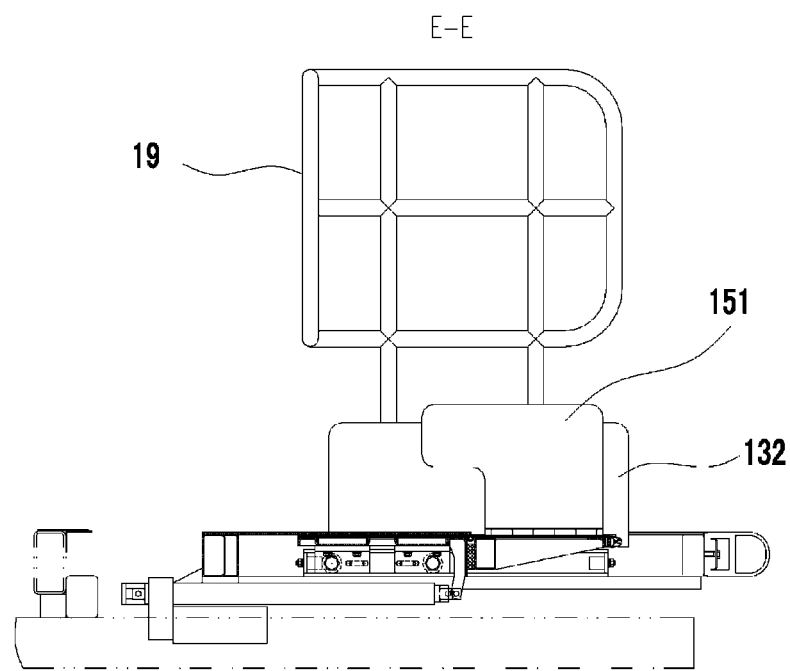
FIG. 8 is a sectional view along the line E-E in FIG. 7.
Figure 9:
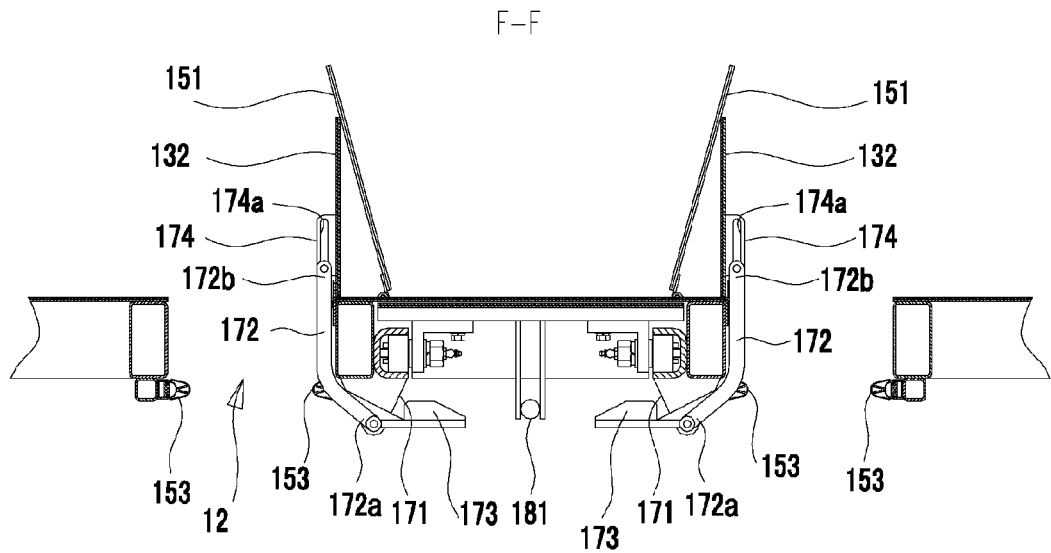
FIG. 9 is a sectional view along the line F-F in FIG. 7.
Figure 10:
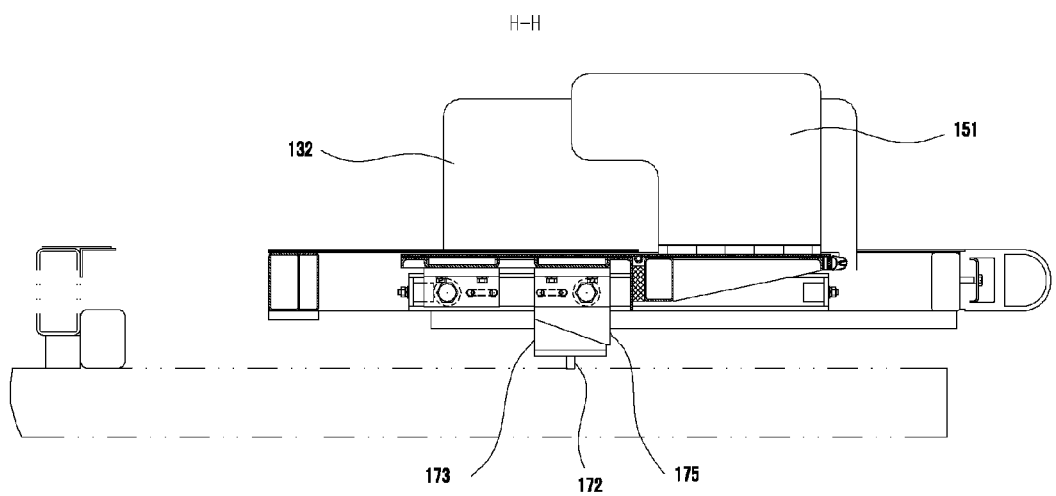
FIG. 10 is a sectional view along the line H-H in FIG. 7.

In one embodiment of the invention, as shown in FIGS. 3 and 6, the joint equipment 10 further comprises a pair of turning mechanisms 17 arranged under the left and the right ends of the sliding plate 14 for turning the pair of front cover plates 151 and the pair of rear cover plates 132. In particular, each of the turning mechanisms 17 comprises a mounting seat 171, a curved lever 172, a wedged block 173, a wedged plate 175 cooperating with the wedged block 173, and a connecting plate 174. The mounting seat 171 is fixed at the bottom of the first beam 131 and/or the guide 161 under the first floor 13, and is preferably configured into a triangle structure with its one side being fixed (e.g. by welding) to the bottom of the first beam 131 and/or the guide 161 and its opposite downward angle being used as a hinge point A for connecting with the curved lever 172. Preferably, the curved lever 172 is hinged to the mounting seat 171 at its first end 172a, e.g. through a pin. The wedged block 173 is fixed to the first end 172a of the curved lever 172, while the wedged plate 175 is arranged at the underside of the sliding plate 14. The connecting plate 174 is fixed at the underside of the corresponding rear cover plate 132. An elongated groove 174a is opened in each of the connecting plates 174, which the second end 172b of the curved lever 172 is limited in and slides along.

Two second beams 121, preferably made of rectangular tubes, are arranged at the undersides of the floor frame 11 beside the periphery of the notch 12 and paralleled to the first beams 131. Preferably, the first and/or the second beams 131, 121 are arranged with a second safety edges 153 at their bottoms. Advantageously, pressure sensors can be provided at the second safety edges 153 as well as the at the first safety edge 152 so as to reduce the collisions between the guardrail 21 (FIGS. 11, 12) of the boarding gate and the joint equipment 10, providing thus an effective protection to both the aircraft and the joint equipment.

Figure 5:
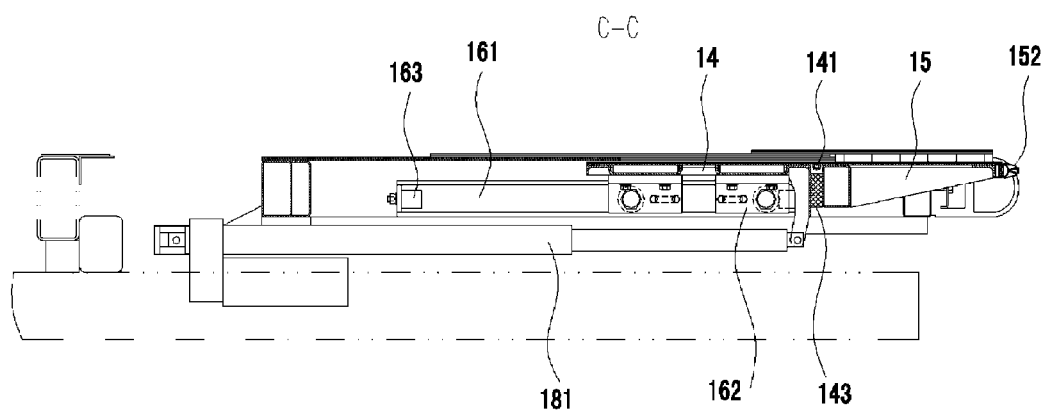
FIG. 5 is a sectional view along the line C-C in FIG. 1.

Referring now to FIG. 5, for achieving the forward extension and backward retraction movement of the sliding plate 14, the joint equipment 10 is provided with an activating device. In particularly, the activating device includes an activator 181, which is connected to the underside of the floor frame 11 at its one end and connected to the underside of the sliding plate 14 at its opposite end. Furthermore, a position limiting block 143 is arranged under the hinge 141 for the joining plate 15, so as to limit the extension of the activator 181. Activated by the activator 181, the sliding plate 14 can slide with respect to the first floor 13 through the movement of the sets of rollers 162 along guide 161 so as to realize the extension and/or retraction with respect to the floor frame 11. In order to prevent the sliding plate 14 from the collision with the floor frame 11 when it retracts, a collision preventing block 163 is arranged at the rear end of at least one of the guides 161.

Referring now to FIGS. 7 to 10, when the sliding plate 14 retracts as the activator 181 retracts, the wedged plate 175 at the underside of the sliding plate 14 engages with the wedged blocks 173 fixed at the first ends 172a of the curved levers 172 and forces them to rotate downwardly, so that the curved levers 172 rotates around the respective hinge points A. Meanwhile, the second end 172b of each of the curved levers 172 slide from the outer end of the elongated groove 174a to the opposite inner end of the groove 174a, forcing the rear cover plate 132 and the front cover plate 151 lapping over said rear one turn upwardly around their hinges 135 and 150 respectively. Gaps are thus formed between the respective sides of the first floor 13 and the floor frame 11. Holes can be formed at the areas of floor frame 11 adjacent to the sides of the concave notch 12, into which plug-and-play typed guardrails 19 can be inserted to increase the safety for the passengers who enter the joint equipment 10.

Figure 11:
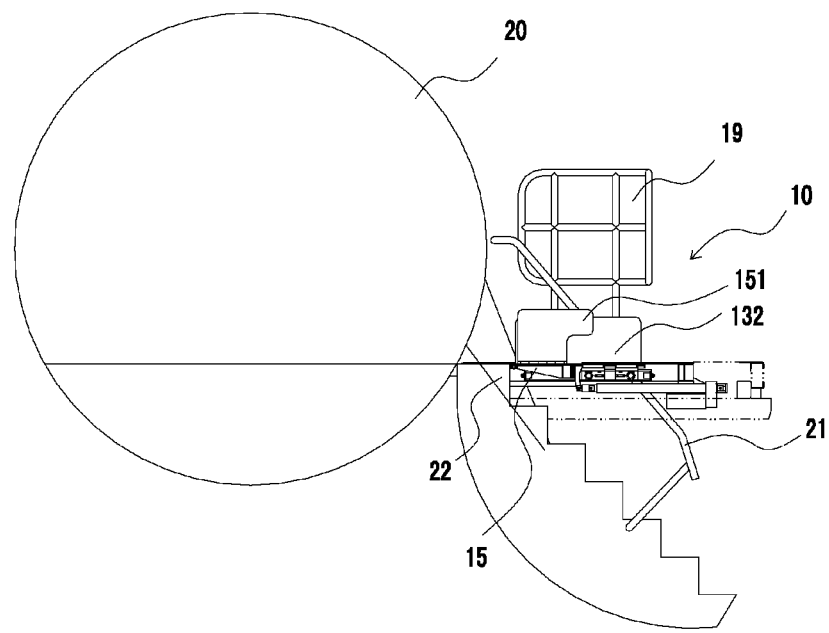
FIG. 11 is a side view showing the joint equipment of the boarding bridge according to one embodiment of the invention with its joining plate butting with the top tread of the extension line aircraft.
Figure 12:
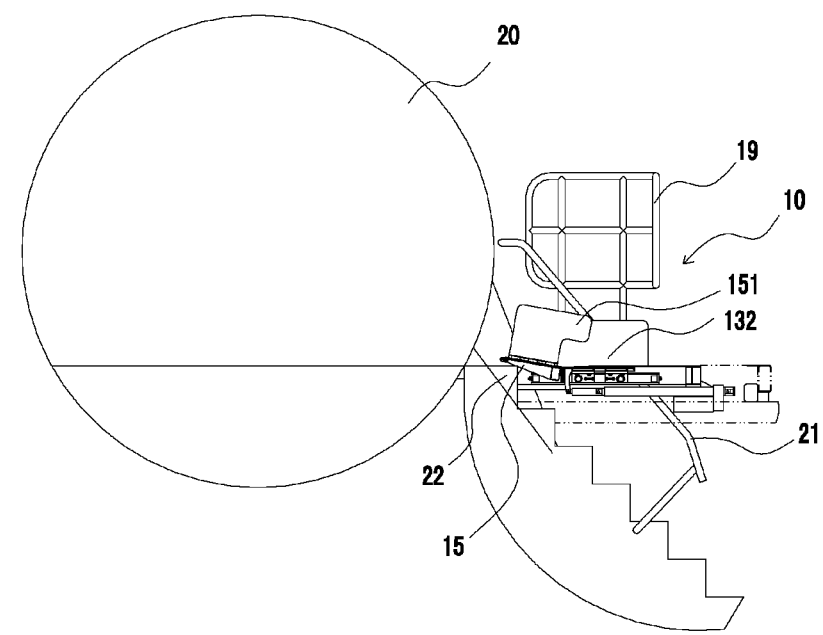
FIG. 12 is a side view showing the joint equipment of the boarding bridge according to one embodiment of the invention with its joining plate lapping over the top tread of the extension line aircraft.

Referring now to FIGS. 11 and 12, the joint equipment 10 is in the operational state and joining with an extension line aircraft 20. At this time, the activator 181 retracts backwardly and forces the sliding plate 14 retracts accordingly, so that a void space presents in front of the first floor 13 for accommodating the treads of the downward turned boarding gate of the extension line aircraft 20. The front cover plates 151 and the rear cover plates 132 are turned upwardly, presenting the gaps between the floor frame 11 and the first floor 13 for accommodating the guardrail 21 of the boarding gate of the extension line aircraft 20. The guardrails 19 can be then inserted into the holes on the floor frame 11 adjacent to the notch 12 to increase safety. In the example shown in FIG. 11, the front edge of the joining plate 15 butts and flushes with the top tread 22 of the extension line aircraft 20. FIG. 12 shows the joint equipment 10 is in another operational state, in which the joining plate 15 lapping over the top tread 22 of the extension line aircraft 20. When the top tread 22 of the aircraft 20 is raised as the aircraft 20 becoming empty, the lapping joining plate 15 with the top tread 22 ensures the stability of the joining between the boarding bridge and the aircraft 20.

Although several preferred embodiments of the present invention have been described, the present invention may be used with other configurations. It will be appreciated by those skilled in the art that, the present invention could have many other embodiments, and changes and modifications may be made thereto without departing from the invention in its broader aspects and as set forth in the following claims and equivalents thereof.

What is claimed is:

1. A joint equipment of a boarding bridge, for joining with a boarding gate of an aircraft, said joint equipment comprising:
    a floor frame having a concave notch at its front end;
    a first floor arranged at the opening of the concave notch;
    a sliding plate arranged under the first floor and slidable with respect to the first floor through a slide device arranged under the sliding plate;
    a joining plate rotatablely connected in the front end of the sliding plate;
    a pair of front cover plates rotatably connected to the left and the right ends of the joining plate respectively;
    a pair of rear cover plates rotatably connected to the left and the right ends of the first floor respectively, wherein the pair of front cover plates are partly lapped over the pair of rear cover plates respectively;
    an activating device for operating sliding movement of the sliding plate with respect to the first floor; and
    a pair of turning mechanisms arranged under the left and the right sides of the sliding plate respectively, for turning the pairs of the front and the rear cover plates with respect to the joining plate and the first floor.

2. The joint equipment of the boarding bridge according to claim 1, wherein the slide device comprises:
    two first beams arranged under and fixed to respective the left and the right ends of the first floor;
    two guides fixed to the inner sides of the respective first beams; and
    two sets of rollers arranged at the underside of the sliding plate and suitable for engaging with and rolling along the guide.

3. The joint equipment of the boarding bridge according to claim 2, wherein each of the guides is equipped with a collision preventing block at its at least one end.

4. The joint equipment of the boarding bridge according to claim 1, wherein the activating device comprises an activator with its one end connected to the underside of the floor frame and its opposite end connected to the underside of the sliding plate.

5. The joint equipment of the boarding bridge according to claim 1, further comprising a guardrail, which can be detachably installed onto the floor frame by inserting into holes arranged in the floor frame adjacent to the notch.

6. The joint equipment of the boarding bridge according to claim 1, wherein each of the turning mechanism comprises:
    a mounting seat having a substantively triangle profile with its one side part being fixed to the bottoms of the corresponding ones of the first beams and the guides and its downward angle part being used as a hinge point;
    a curved lever having a first end pivotably connected to the hinge point and a second end;
    a wedged block fixed to the first end of the curved lever;
    a wedged plate arranged at the underside of the sliding plate for engaging and cooperating with the wedged block; and
    a connecting plate fixed to the underside of the corresponding rear cover plate and having an elongated groove therein, wherein the second end of the curved lever is configured to be suitable to limited in and slides along the elongated groove.

7. The joint equipment of the boarding bridge according to claim 1, wherein the floor frame is arranged with two ferry plates at left and right sides of its rear end respectively.

8. The joint equipment of the boarding bridge according to claim 1, wherein a safety edge is arranged at the front end of the joining plate, with a pressure sensor arranged thereon.

9. The joint equipment of the boarding bridge according to claim 2, wherein two second beams are arranged at the underside of the floor frame beside the notch, paralleling to the first beams,
   wherein safety edges are arranged face to face at the bottoms of the corresponding first and second beams, with a pressure sensor arranged thereon.

10. The joint equipment of the boarding bridge according to claim 1, wherein a detachable and movable front edge is arranged at the front end of the floor frame.

11. A boarding bridge for connecting a terminal building with an aircraft, comprising:
   a tunnel having a front end and a rear end connected with the terminal building;
   a rotunda arranged at the front end of the tunnel; and
   a joint equipment for joining with an boarding gate of the aircraft, comprising:
      a floor frame having a concave notch at its front end, movably connected to the rotunda;
      a first floor arranged at the opening of the concave notch;
      a sliding plate arranged under the first floor and slidable with respect to the first floor through a slide device arranged under the sliding plate;
      a joining plate rotatablely connected in the front end of the sliding plate;
      a pair of front cover plates rotatably connected to the left and the right ends of the joining plate respectively;
      a pair of rear cover plates rotatably connected to the left and the right ends of the first floor respectively, and wherein the pair of front cover plates are partly lapped over the pair of rear cover plates respectively;
      an activating device for operating sliding movement of the sliding plate with respect to the first floor; and
      a pair of turning mechanisms arranged under the left and the right sides of the sliding plate respectively, for turning the pairs of the front and the rear cover plates respectively with respect to the joining plate and the first floor.

12. The boarding bridge according to claim 11, wherein the slide device comprises:
   two first beams arranged under and fixed to respective the left and the right ends of the first floor;
   two guides fixed to the inner sides of the respective first beams; and
   two sets of rollers arranged at the underside of the sliding plate and suitable for engaging with and rolling along the guide.

13. The boarding bridge according to claim 12, wherein each of the guides is equipped with a collision preventing block at it's at least one end.

14. The boarding bridge according to claim 11, wherein the activating device comprises an activator with its one end connected to the underside of the floor frame and its opposite end connected to the underside of the sliding plate.

15. The boarding bridge according to claim 11, wherein the joint equipment further comprises a guardrail, which can be detachablely installed onto the floor frame by inserting into holes arranged in the floor frame adjacent to the notch.

16. The boarding bridge according to claim 11, wherein each of the turning mechanism comprises:
   a mounting seat having a substantively triangle profile with its one side part being fixed to the bottoms of the corresponding ones of the first beams and the guides and its downward angle part being used as a hinge point;
   a curved lever having a first end pivotably connected to the hinge point and a second end,
   a wedged block fixed to the first end of the curved lever;
   a wedged plate arranged at the underside of the sliding plate for engaging and cooperating with the wedged block; and
   a connecting plate fixed to the underside of the corresponding rear cover plate and having an elongated groove therein, wherein the second end of the curved lever is configured to be suitable to limited in and slides along the elongated groove.

17. The boarding bridge according to claim 11, wherein the floor frame is arranged with two ferry plates at left and right sides of its rear end respectively.

18. The boarding bridge according to claim 11, wherein a safety edge is arranged at the front end of the joining plate, with a pressure sensor arranged thereon.

19. The boarding bridge according claim 12, wherein two second beams are arranged at the underside of the floor frame beside the notch, paralleling to the first beams,
   wherein safety edges are arranged face to face at the bottoms of the corresponding first and second beams, with a pressure sensor arranged thereon.

20. The boarding bridge according to claim 11, wherein a detachable and movable front edge is arranged at the front end of the floor frame.

* * * * *